United States Patent [19]

Nicholson, deceased

[11] 3,754,290
[45] Aug. 28, 1973

[54] FLY FISHERMAN'S LEADER CUTTER
[76] Inventor: Joseph Harrington Nicholson, deceased, late of Union Valley Rd., Mahopac, N.Y. 10541 Alice Barker Nicholson, executrix
[22] Filed: Nov. 17, 1970
[21] Appl. No.: 90,354

[52] U.S. Cl.............................. 7/1 H, 81/43, 30/175
[51] Int. Cl.......................... B25f 1/00, B26b 17/04
[58] Field of Search....................... 81/43; 7/1 P, 5.5, 7/1 H; 30/28, 175; 128/354

[56] References Cited
UNITED STATES PATENTS
1,433,340  10/1922  Clark .................................. 128/354
2,934,070  4/1960  Jerry ................................... 128/354

FOREIGN PATENTS OR APPLICATIONS
449,001  6/1936  Great Britain ...................... 30/175
91,073  12/1937  Sweden ............................... 30/175

Primary Examiner—Robert C. Riordon
Assistant Examiner—Roscoe V. Parker
Attorney—John F. Osterndorf

[57] ABSTRACT

A cutter for a fly fisherman's leader line. The cutter is a bifurcated spring loaded tool having a cutting instrument with an observable convex edge affixed to one of the bifurcations. Provision is also made for the cutter to carry a hook cleaner and hook storer. The cutter is particularly adapted for use in cutting highly resistant materials such as nylon, dacron and other synthetics.

4 Claims, 4 Drawing Figures

Patented Aug. 28, 1973  3,754,290

INVENTOR
JOSEPH HARRINGTON NICHOLSON

BY John F. Osterndorf
ATTORNEY

FLY FISHERMAN'S LEADER CUTTER

BACKGROUND OF THE INVENTION

1. Field of the Invention

This invention relates to fisherman's tools and, more particularly, to a leader line cutting tool for use by fishermen when tieing leaders to a hook.

2. Description of the Prior Art

Fishermen tie a leader line to a fly, that is, a hook dressed with feathers in imitation of a fly. It is necessary that the leader line be cut after the tie is made. When a fly must be changed or replaced, a fisherman is usually fishing in a stream. Under these circumstances the tieing of a fly and subsequent cutting of the leader requires the use of a tool that is readily accessible, is easy to operate and has the least amount of gadgetry involved. No simple tool presently exists for satisfying these objectives.

Ordinarily, a pair of scissors or a variation of a nail-clipper is employed for accomplishing the cutting of the leader. These tools and others like them are modified to improvise for this use. The scissor-type cutter has the usual cutting blades with one edge serrated and the other plain. A recess may be provided in one of the blades to hold the fly during the cutting operation.

The nailclipper type of cutter has two blades and a pressure exerting arm. Cutting edges concave in shape are provided at the ends of the blades. The concave shape of the cutting portion prevents the fisherman from observing what is being cut. To use such a device requires that the lever arm be correctly positioned for exerting pressure on the blades to accomplish the cutting operation.

The nailclipper type of device also has the disadvantage of having the cutting edges integrally formed with the blades. After a short period of time these edges corrode necessitating the disposal of the entire clipper and replacement with a new clipper.

It is apparent that these prior art types of cutting tools are cumbersome and difficult to operate while fishing. They fail to satisfy the needs and requirements of the fisherman for cutting the synthetic materials used in the fisherman's leader line.

SUMMARY OF THE INVENTION

As contrasted with the prior art types of devices, the cutter of the invention is simple to operate, easy to handle and does not encompass a great deal of gadgetry in order to perform the cutting operation. The cutter readily acts on monofilament type synthetic materials. It is formed of a pair of bifurcated arms at least one of which is bowed. The arms are affixed in one embodiment at a common end providing a tweezer or nipping action between the arms when pressure is exerted on them by squeezing them together. One of the arms carries at the non-affixed end a removable and replaceable cutting jaw having a convex cutting edge.

When the leader line is inserted between the arms at the open end, it may sit on the arm that does not carry the cutting jaw. The cutting edge of the jaw readily severs the leader with the minimum amount of pressure exerted on the arms by the thumb and a finger of the user.

A modification of the cutter provides for the bifurcated arms to be spring-loaded at one end by forming them in a continuous loop. Again on the exertion of pressure between the two arms the tweezer or nipping action occurs and the cutting edge readily severs the leader line inserted between the arms at the open end of the cutter. As the cutting jaw has a convex shape at the cutting edge, the cutting operation is readily viewable to the user. The operation is simple to perform without requiring the movement of any of the parts or elements of the tool other than the exertion of pressure on the arms. The cutting jaw is readily removable from the arm portion of the cutter where it is affixed and is replaceable when worn out or corroded. Replacement does not require disposal of the entire cutter.

Another modification of the tool provides for the cutting jaw to have another cutting edge on the oppositely disposed jaw surface so that when the first edge is worn, an entirely new cutting edge is provided simply by reversing the position of the jaw.

Other features of the invention provide for the inclusion of a hook cleaner which is movable with respect to one arm and carried along this arm. This hook cleaner may be carried by either arm of the cutter. The cleaner has a hook storing provision which allows the fisherman to insert hooks or flies into it while he is in the process of changing a fly.

DESCRIPTION OF THE PREFERRED EMBODIMENTS

Figure 1:
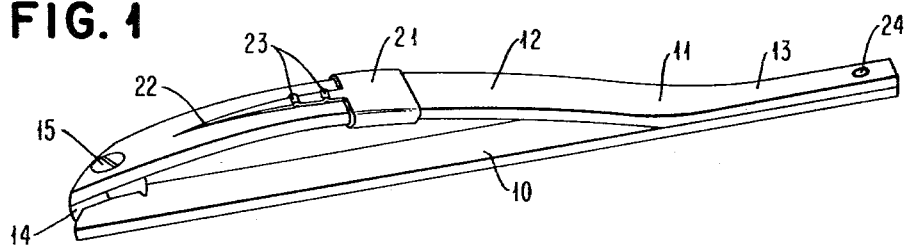
FIG. 1 is a perspective view of one embodiment of the cutter of the invention.

Referring now to FIG. 1, the cutting tool comprises a pair of bifurcated arms 10, 11. Arm 10 is straight and arm 11 is bowed at the portion 12. With arm 11 bowed, the tool is spring loaded. The arms respond to simple pressure exerted by the fingers of the user and create the tweezer or nipping action necessary for cutting the leader line of the fisherman. The arms are secured at one end 13. This may be accomplished by riveting the two arms together or by welding them together in the position shown.

Upper arm 11 carries at the end opposite to the affixed end and at substantially the end of the bowed portion 12, a cutting jaw 14. Cutting jaw 14 is secured to arm 11 by suitable attaching means such as a screw 15. Preferably the front edge of arm 11, that is the cutting edge, has a convex curvature although this is not essential for the operation of the tool. With the exercise of the least amount of thumb and finger pressure by the user, it has been found that the various synthetic fiber materials such as nylon, dacron and other monofilament materials may be readily cut.

A modified form of the cutting instrument of the invention provides for both arms 10 and 11 to be formed in one continuous piece of material with fastening at one end. A loop 16 provides the continuity in joining both arms 10 and 11. To provide the necessary spring action for accomplishing the tweezer or nipping cutting action of the tool, arm 11 is bowed at 12. By the exercise of minimum pressure by the user the cutter performs the operation of severing the leader line. If it is desired to maintain arms 10, 11, in the embodiment of FIG. 2, at a predetermined distance with respect to one another at end 13 of the tool, suitable rivets or screws 17 may be employed to accomplish this.

Figure 3:
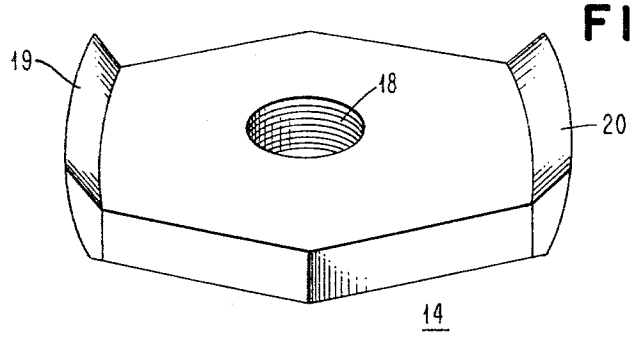
FIG. 3 is a perspective view of the cutting jaw.

As shown in FIG. 3 the cutting jaw 14 is substantially diamond shaped. To obtain this shape, it is machined from an originally round element into the substantially diamond shape. This shape is not critical to the operation of the device but is provided to assure that the cutter falls within the sides of arms 10 and 11 of the tool. Hole 18 is provided in the cutting jaw so that it may be affixed to the arm 11 of the instrument. Cutting edges 19, 20 are provided from the same surface from opposing ends of the hexagonal shaped cutting jaw. As is apparent, each of the cutting edges is convex in shape. When the cutting jaw is affixed to arm 11 of the tool, the cutting operation is readily observable by the user.

Only one cutting edge 19 or 20 is employed at a time in the cutting operation. By loosening screw 15 carried by arm 11, cutting jaw 14 is rotated within the instrument and the other cutting edge is positioned to perform the cutting operation. The use of the convex cutting edge on the jaw facilitates the cutting of the leader line for tieing the fly. Cutting of the leader line at an angle minimizes the amount of pressure to be exerted by the user.

Figure 2:
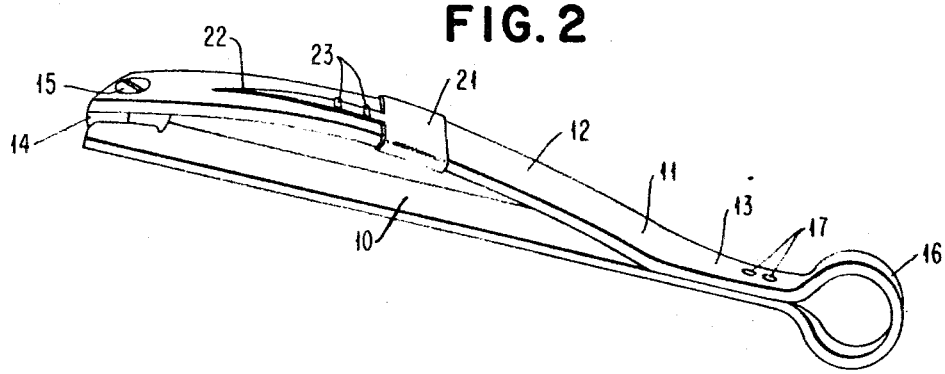
FIG. 2 is a perspective view of another embodiment of the cutter of the invention.
Figure 4:
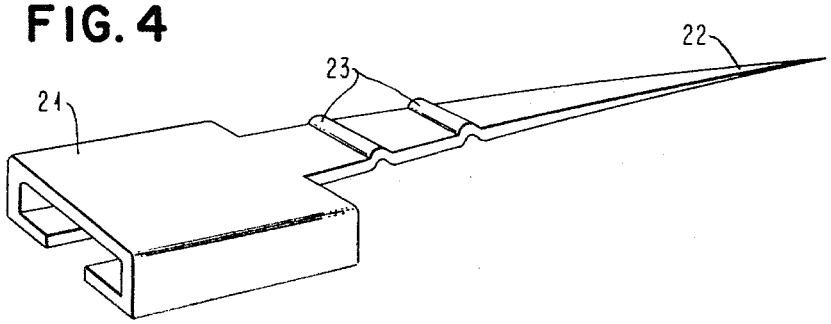
FIG. 4 is a perspective view of a hook cleaner carried by the cutting tool and having provision for the storage of hooks.

The cutting tool, as shown in FIGS. 1 and 2, also carries a cleaner 21 for the eye of the hook. Cleaner 21 is movable along arm 11 and carries a pointed projection 22 for insertion into the eye of the fly. It is readily apparent that the cleaner may also be carried by the other arm 10 of the instrument. The pointed projection 22 of the cleaner also has protrusions at 23 providing a space between the cleaner and the upper surface of arm 11. Spare hooks or flies are carried in these protrusions of the device. The cutting instrument of FIGS. 1 and 2 is also provided with an aperture or hole at 24 to permit the tool to be carried on the pocket of the user when not in use.

In fabricating the cutting tool two different types of materials are employed. The arms may be made separately as in FIG. 1 and thereafter affixed or they may be made in one continuous piece (FIG. 2) with the bowed portion 16. Thereafter, they are positioned using suitable rivets or screws 17. These arms are fabricated from stainless steel. The cutting jaws, shown more particularly in FIG. 3, may be made from hardened steel. The cutter part material has a higher brunnel test than the material of the arm or seating part which acts as the other part of the cutter.

The cutting edge (formed of the hardened material) acts against the end of the stainless steel arm, obviating the need for perfect alignment as is required when two hardened materials coact. It has been found that the use of two dissimilar materials working against each other reduces the degree of pressure that must be exerted by the fingers of the user.

As the body part of the tool, that is the arms, are made from stainless steel, rust and corrosion will not attack them. On the other hand, the cutting portion which is readily removable from the body portion is made from hardened steel so that after they are worn or corroded they may be dis-carded and readily replaced.

While the invention has been particularly shown and described with reference to the preferred embodiments thereof, it will be understood by those skilled in the art that various changes in form and detail may be made therein without departing from the spirit and scope of the invention.

What is claimed is:

1. A cutting instrument for fisherman's leader line, comprising
   first and second elongated arms formed on one metallic material that is corrosion resistant,
   means affixing the arms together at respective first end portions so that the arms are contiguous and in planes parallel to one another at the first end portions, at least the first of said arms having a bow configuration with respect to the second of said arms throughout the remaining portions of said arms, so that the arms are normally spaced apart at their second end portions and perform a nipping action when squeezed together,
   a unitary cutting jaw formed of a metallic material substantially harder than the metallic material of the arms and including at least one convex cutting edge, and
   means removably and replaceably affixing the cutting jaw to the second end portion of the first arm with the cutting edge in a facing position to the second end portion of the second arm and with the convex cutting edge contiguous to the end of the first arm, whereby cutting of a fisherman's leader line located between the second end portions of said arms occurs within his view when the arms are squeezed together and the cutting edge is seated on the second end portion of the second arm.

2. The instrument of claim 1 wherein the cutting jaw has plural convex cutting edges and each edge is rotatable to the cutting position.

3. The instrument of claim 1 wherein the first of said arms has cleaning means for the eye of a fishing hook movably mounted on said arm for extension beyond the second end portion of said arm, and said cleaning means has at least one serration forming a recess therein for retaining a hook.

4. The instrument of claim 1 wherein the cutting jaw is formed of hardened steel and the arms are formed of stainless steel.

* * * * *